(12) United States Patent
Kobayashi et al.

(10) Patent No.: US 11,437,883 B2
(45) Date of Patent: Sep. 6, 2022

(54) DRIVE UNIT

(71) Applicant: HONDA MOTOR CO., LTD., Tokyo (JP)

(72) Inventors: Heisuke Kobayashi, Saitama (JP); Keisuke Hisada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 16/919,334

(22) Filed: Jul. 2, 2020

(65) Prior Publication Data

US 2021/0006124 A1 Jan. 7, 2021

(30) Foreign Application Priority Data

Jul. 2, 2019 (JP) .............................. JP2019-123966

(51) Int. Cl.
*H02K 5/22* (2006.01)
*H01R 9/22* (2006.01)
(Continued)

(52) U.S. Cl.
CPC .............. *H02K 5/225* (2013.01); *B60K 1/00* (2013.01); *B60K 1/04* (2013.01); *B60R 16/03* (2013.01); *H01R 9/223* (2013.01); *H02K 5/04* (2013.01); *H02K 11/33* (2016.01); *B60K 6/20* (2013.01); *B60K 2001/0438* (2013.01); *B60Y 2200/91* (2013.01); *B60Y 2200/92* (2013.01); *H01R 4/28* (2013.01)

(58) Field of Classification Search
CPC ............ H02K 5/04; H02K 5/225; B06K 1/00
See application file for complete search history.

(56) References Cited

U.S. PATENT DOCUMENTS

2011/0163705 A1 7/2011 Sato et al.
2014/0202781 A1 7/2014 Soma et al.
(Continued)

FOREIGN PATENT DOCUMENTS

JP H10-290596 A 10/1998
JP 2000-023408 A 1/2000
(Continued)

OTHER PUBLICATIONS

Feb. 24, 2021, Japanese Office Action issued for related JP application No. 2019-123966.

*Primary Examiner* — Ramon M Barrera
(74) *Attorney, Agent, or Firm* — Paratus Law Group, PLLC (57) ABSTRACT

A drive unit includes: a rotating electric machine having a rotation axis extending in a horizontal direction; a rotating electric machine case which accommodates the rotating electric machine; and a power conversion device converting electric power supplied to the rotating electric machine and electric power supplied from the rotating electric machine. The power conversion device is arranged on one side of the rotating electric machine. A first connector portion, to which a power line connected to a battery is connected, is provided on an upper portion of the power conversion device to face the horizontal direction. The first connector portion includes an internal connection portion connected to a conductive member arranged inside the power conversion device, and the first connector portion has a configuration in which the internal connection portion permits access from an upper side of the power conversion device.

8 Claims, 5 Drawing Sheets

(51) Int. Cl.
    *H02K 11/33*     (2016.01)
    *H02K 5/04*     (2006.01)
    *B60K 1/00*     (2006.01)
    *B60K 1/04*     (2019.01)
    *B60R 16/03*     (2006.01)
    *H01R 4/28*     (2006.01)
    *B60K 6/20*     (2007.10)

(56) References Cited

U.S. PATENT DOCUMENTS

| | | |
|---|---|---|
| 2018/0022202 A1 | 1/2018 | Urabe et al. |
| 2018/0262089 A1 | 9/2018 | Hatch |

FOREIGN PATENT DOCUMENTS

| | | |
|---|---|---|
| JP | 2001-354040 A | 12/2001 |
| JP | 2010-187436 A | 8/2010 |
| JP | 5259884 B1 | 8/2013 |
| JP | 2015-008595 A | 1/2015 |
| JP | 2018-007374 A | 1/2018 |
| WO | WO 2007/108049 A1 | 9/2007 |
| WO | WO 2016/121032 A1 | 8/2016 |

DRIVE UNIT

CROSS-REFERENCE TO RELATED APPLICATIONS

The present application claims the benefit of priority of Japanese Patent Application No. 2019-123966, filed on Jul. 2, 2019, the content of which is incorporated herein by reference.

TECHNICAL FIELD

The present invention relates to a drive unit mounted on an electric vehicle or the like.

BACKGROUND ART

Vehicles such as hybrid vehicles and electric vehicles which use a rotating electric machine as a drive source are known. In such a vehicle, a power conversion device which is electrically connected to a rotating electric machine and which converts electric power supplied to the rotating electric machine and electric power supplied from the rotating electric machine is mounted together with the rotating electric machine. The rotating electric machine and the power conversion device were electrically connected using a three-phase wire, but in recent years, it has been attempted to directly fix the rotating electric machine and the power conversion device into a unit.

For example, International Publication No. 2016-121032 proposes, as a drive unit, to directly fix a power conversion device above a rotating electric machine. However, with the configuration described in International Publication No. 2016-121032, the height dimension of the drive unit becomes large, and thus the degree of freedom in layout decreases. U.S. Patent Application Publication No. 2018-0262089 proposes, as a drive unit, directly fixing a power conversion device to one side of a rotating electric machine in an orthogonal direction orthogonal to both a rotation axis direction and an up-down direction.

The power conversion device is provided with a connector portion to which a DC line connected to a battery is connected. The connector portion includes an internal connection portion connected to a conductive member arranged inside the power conversion device and the power conversion device converts the DC power transmitted from the DC line to AC power via the switching circuit and conversely converts the AC power transmitted from a rotating electric machine to DC power via the switching circuit.

A tool such as a wrench or a screwdriver is generally used for a connection work between the conductive member and the internal connection portion, and thus a space (hereinafter, a tool space) for inserting the tool is required in the power conversion device. It is preferable that the power conversion device be reduced in size. When a large tool space is secured, downsizing of the power conversion device is hindered.

SUMMARY

The invention provides a drive unit which can be reduced in size.

According to an aspect of the invention, there is provided a drive unit including: a rotating electric machine having a rotation axis extending in a horizontal direction; a rotating electric machine case which accommodates the rotating electric machine; and a power conversion device electrically connected to the rotating electric machine and configured to convert electric power supplied to the rotating electric machine and electric power supplied from the rotating electric machine, in which: the power conversion device is arranged on one side of the rotating electric machine in an orthogonal direction orthogonal to both a rotation axis direction and an up-down direction; a first connector portion, to which a power line connected to a battery is connected, is provided on an upper portion of the power conversion device to face the horizontal direction; the first connector portion includes an internal connection portion connected to a conductive member arranged inside the power conversion device; and the first connector portion has a configuration in which the internal connection portion permits access from an upper side of the power conversion device.

According to the invention, it is not necessary to secure a large tool space inside a power conversion device and the power conversion device can be reduced in size.

DESCRIPTION OF EMBODIMENTS

Hereinafter, a drive unit of an embodiment of the invention and a vehicle of an embodiment equipped with the drive unit will be described with reference to the drawings. In the following description, front-rear, left-right, and up-down are described according to the direction viewed from an operator of the vehicle. The drawing indicates the front of the vehicle as Fr, the rear as Rr, the left as L, the right as R, the upper as U, and the lower as D.

Figure 1:
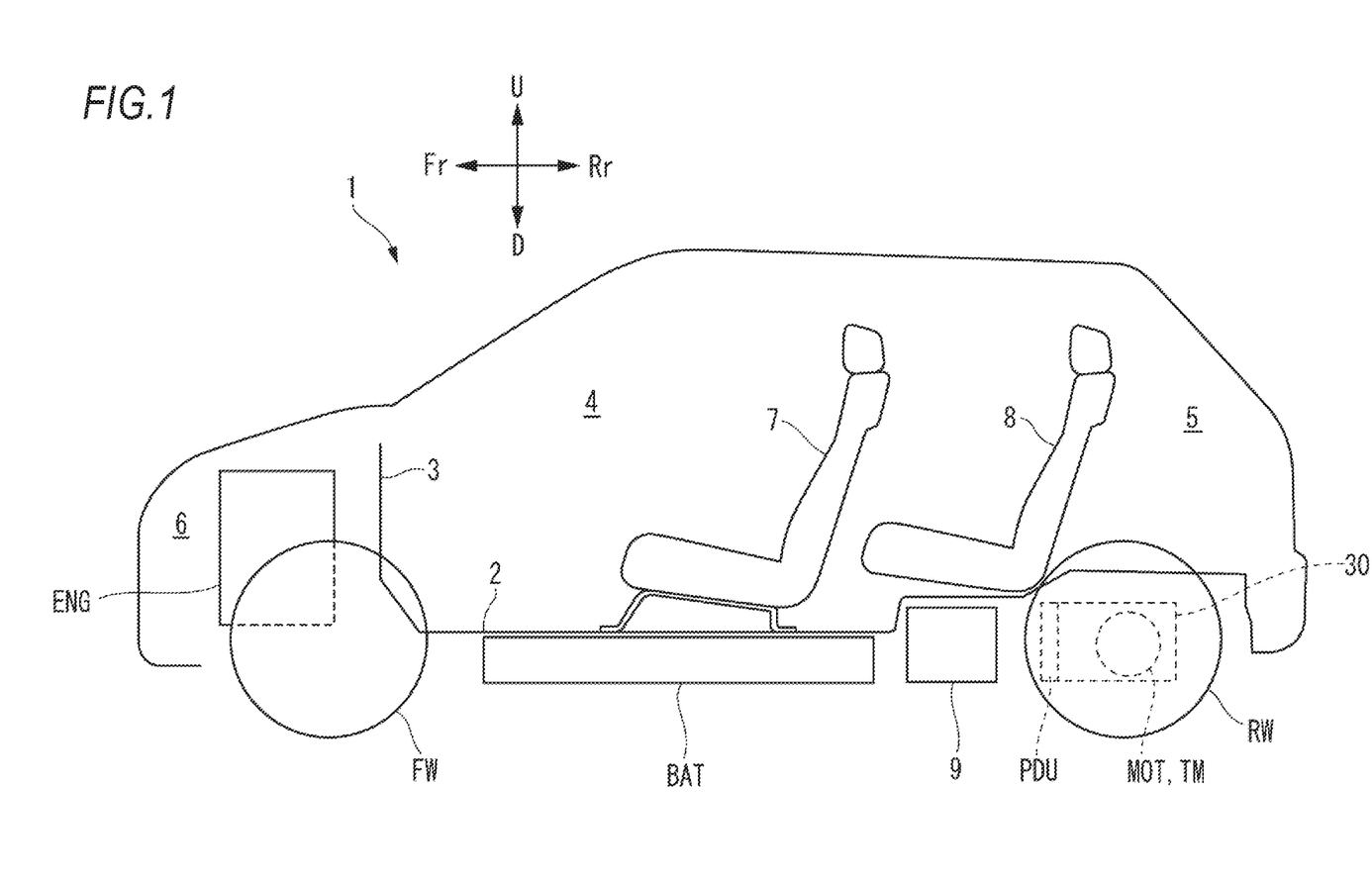
FIG. 1 is a schematic side view illustrating an overall structure of a vehicle in which a drive unit according to an embodiment of the invention can be mounted.
Figure 2:
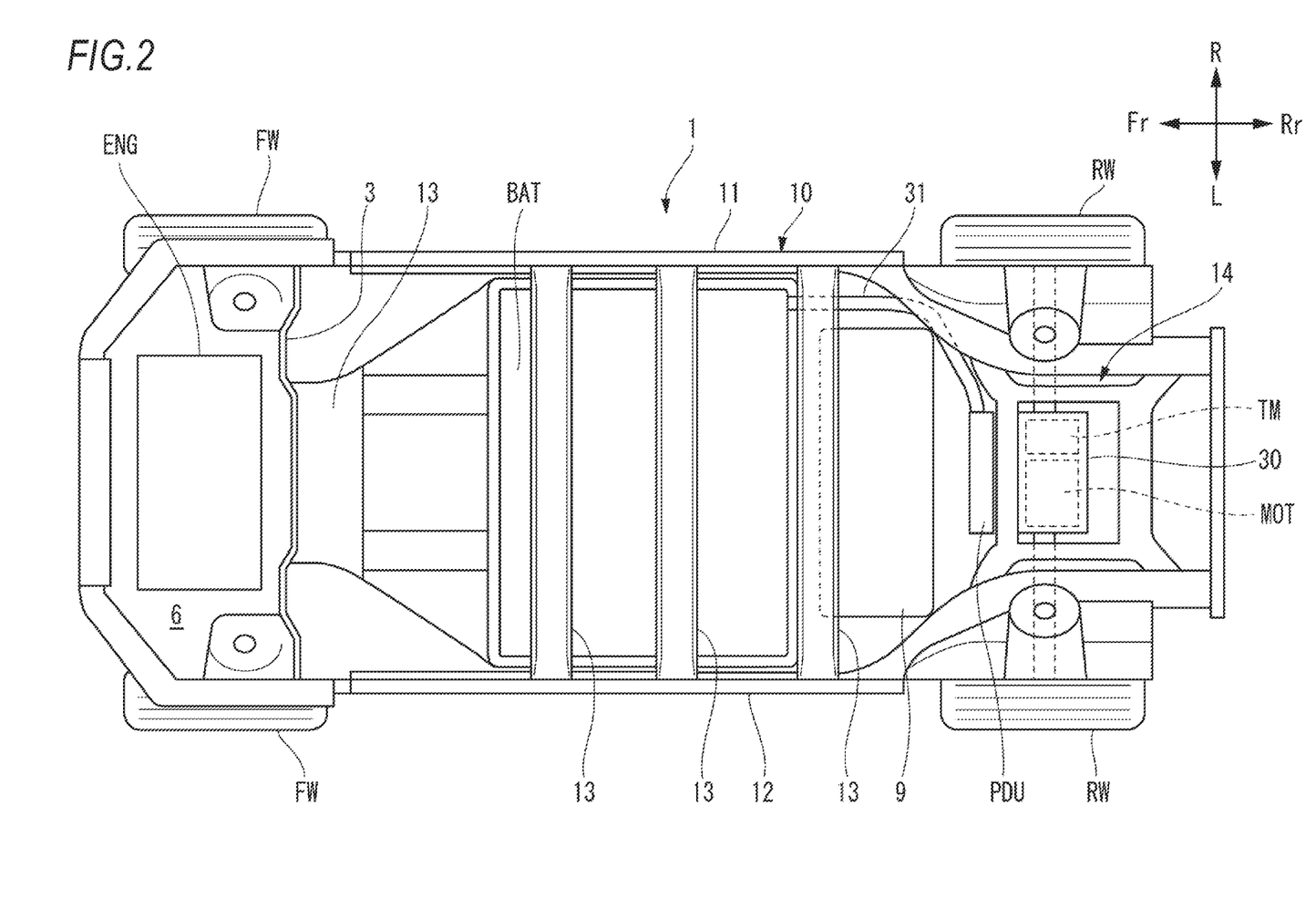
FIG. 2 is a plan view illustrating an underfloor structure of the vehicle of FIG. 1.

As illustrated in FIGS. 1 and 2, a vehicle 1 is partitioned by a floor panel 2 and a dash panel 3 into a passenger compartment 4, a luggage compartment 5 and a front room 6 in front of the compartment. The passenger compartment 4 is provided with a front seat 7 and a rear seat 8. The front room 6 is provided with an engine ENG as a drive source for driving left and right front wheels FW and a drive unit 30 accommodating an electric motor MOT as a drive source for driving left and right rear wheels RW is provided below the luggage compartment 5. That is, the vehicle 1 is a so-called hybrid vehicle which uses both the engine ENG and the electric motor MOT as drive sources.

Below the passenger compartment 4, a battery BAT and a fuel tank 9 are arranged. The battery BAT and the drive unit 30 are connected via a DC line 31 and the engine ENG and the fuel tank 9 are connected via a fuel pipe (not illustrated).

A vehicle body frame 10 includes a pair of left and right side frames 11 and 12 extending in a front-rear direction, a plurality of cross members 13 extending in a vehicle width direction (hereinafter also referred to as a left-right direction) and connecting the side frames 11 and 12, and a sub-frame 14 which supports the drive unit 30 and has a substantially rectangular shape in a plan view.

Figure 3:
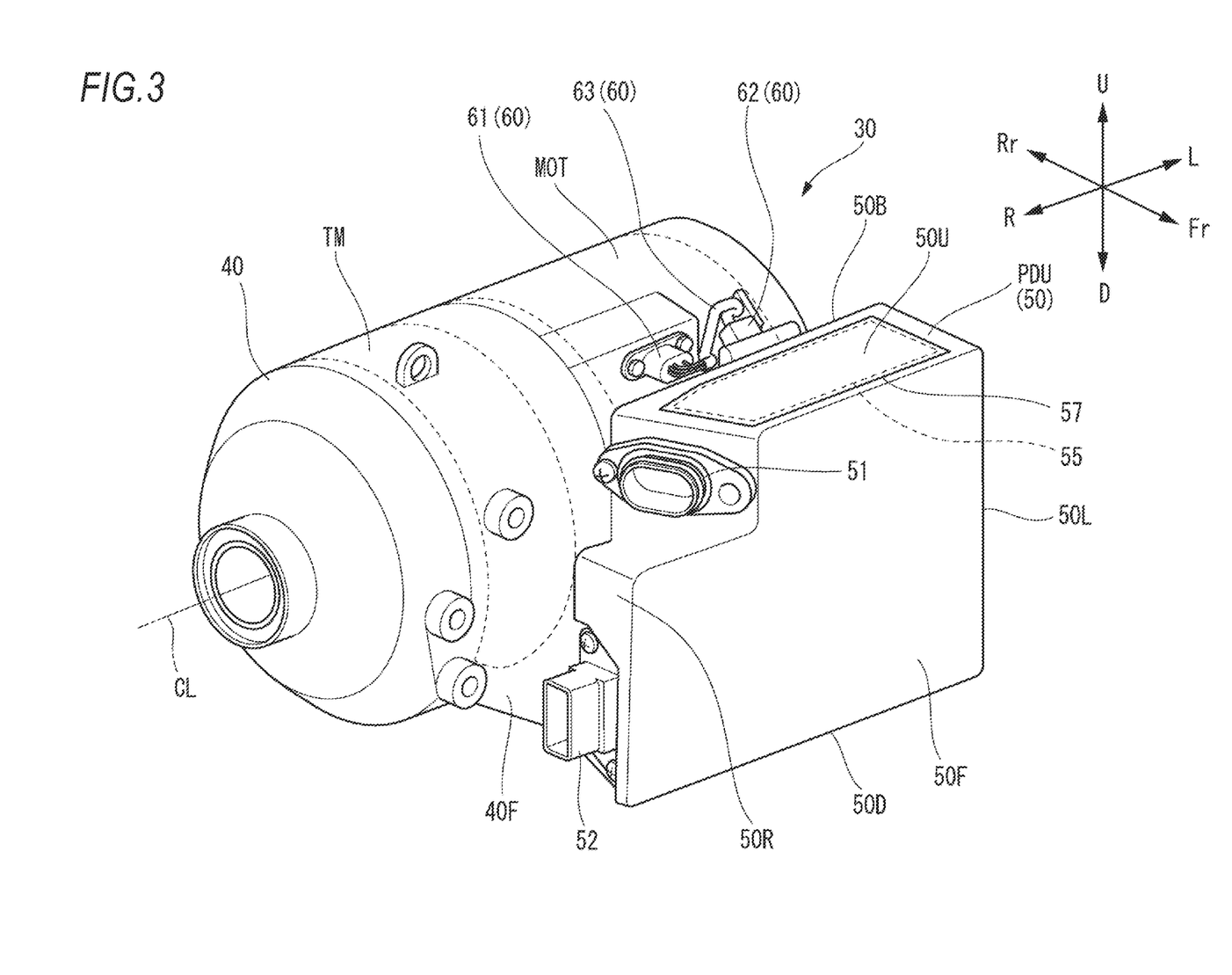
FIG. 3 is an overall perspective view of the drive unit according to the embodiment of the invention.

As illustrated in FIG. 3, the drive unit 30 includes the electric motor MOT, a power conversion device PDU which is electrically connected to the electric motor MOT and converts electric power supplied to the electric motor MOT and electric power supplied from the electric motor MOT, and a power transmission mechanism TM for transmitting the power of the electric motor MOT to the rear wheels RW. The power conversion device PDU is, for example, an inverter.

The electric motor MOT has a substantially cylindrical shape and a rotation axis CL extends to be substantially parallel to a vehicle width direction. The rotation axis CL is a rotation axis center of the electric motor MOT. The power transmission mechanism TM is arranged side by side with the electric motor MOT in the vehicle width direction such that the axis center of an output shaft is coaxial with the rotation axis CL of the electric motor MOT. In the embodiment, the electric motor MOT and the power transmission mechanism TM are arranged side by side in the vehicle width direction such that the electric motor MOT is on the left side and the power transmission mechanism TM is on the right side.

The power conversion device PDU is arranged adjacent to the front of the electric motor MOT and the power transmission mechanism TM in the front-rear direction of the vehicle 1. The power conversion device PDU is located between the electric motor MOT and the power transmission mechanism TM and the passenger compartment 4 (see FIG. 1). That is, in the embodiment, the power conversion device PDU is located in front of the electric motor MOT and the power transmission mechanism TM. Therefore, at the time of the rear collision of the vehicle 1, in the drive unit 30, the impact is input to the electric motor MOT and the power transmission mechanism TM located behind the power conversion device PDU. As a result, it is possible to prevent the impact caused by the rear collision of the vehicle 1 from being directly input to the power conversion device PDU.

The power conversion device PDU includes a power conversion device case 50. The power conversion device case 50 has a substantially rectangular parallelepiped shape and includes a front surface 50F, a rear surface 50B, a left surface 50L, a right surface 50R, an upper surface 50U, and a lower surface 50D. The power conversion device case 50 is fixed to an electric motor case 40 such that the rear surface 50B of the power conversion device case 50 faces the front surface 40F of the electric motor case 40.

Figure 4:
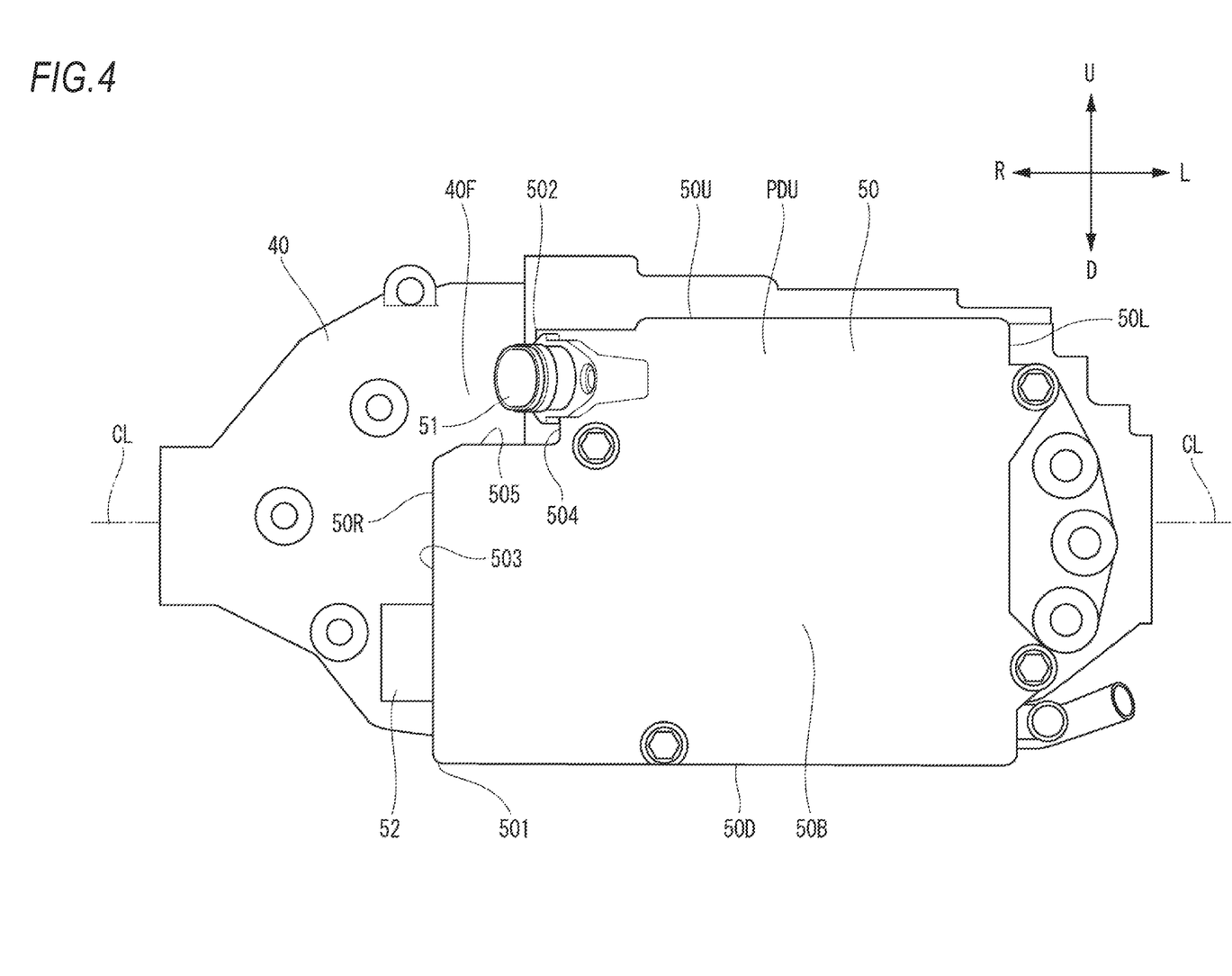
FIG. 4 is a diagram of the drive unit of FIG. 3 viewed from the front.
Figure 5:
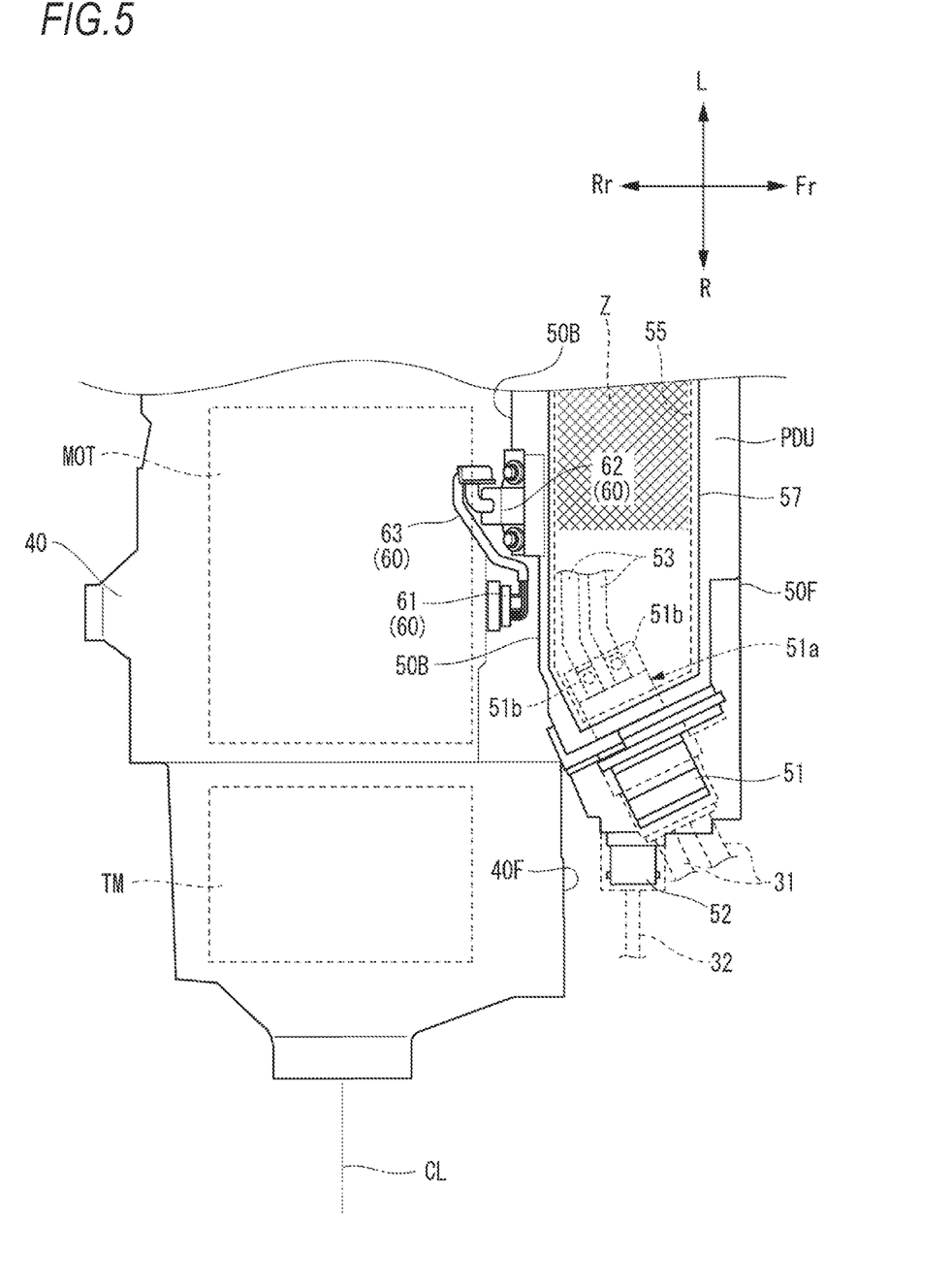
FIG. 5 is an enlarged view of a main part of the drive unit of FIG. 3 as seen from above.

As illustrated in FIGS. 3 to 5, a DC connector 51 to which the DC line 31 is connected is provided on an upper side of the power conversion device case 50 to face a horizontal direction. The upper side of the power conversion device case 50 means the side located above a center of the power conversion device case 50 in the up-down direction. The fact that the DC connector 51 faces the horizontal direction means that the DC line 31 is connected from the horizontal direction. More specifically, in the right surface 50R of the power conversion device case 50, the DC connector 51 is provided on the upper side to face diagonally forward to the right and a low-voltage connector 52 is provided on the lower side. In FIG. 5, reference numeral 32 indicates a low-voltage line connected to the low-voltage connector 52.

More specifically with reference to FIG. 4, in the power conversion device case 50 of the power conversion device PDU, a right upper end 502 is located further on the left side than a right lower end 501 in the left-right direction when viewed in the front-rear direction. On the right surface 50R of the power conversion device case 50, a right lower side surface 503 extending upward from the right lower end 501 of the power conversion device case 50, an right upper side surface 504 which extends downward from the right upper end 502 of the power conversion device case 50 and is located further on the left side than the right lower side surface 503 in the left-right direction, and a step surface 505 which connects the upper end of the right lower side surface 503 and the lower end of the right upper side surface 504 in the left-right direction are provided. The DC connector 51 is arranged on the upper right side surface 504 and the low-voltage connector 52 is arranged on the right lower side surface 503.

The DC connector 51 is located below the upper surface 50U of the power conversion device PDU and further on the left side than the lower right side surface 503 in the left-right direction. The DC connector 51 can be prevented from being exposed further to the outside than the power conversion device PDU in the up-down direction and the left-right direction (rotation axis direction).

As illustrated in FIG. 5, the DC connector 51 arranged on the right upper side surface 504 is arranged to protrude obliquely to the front right from the power conversion device PDU when viewed from above. That is, the DC connector 51 is disposed to protrude from the power conversion device PDU at a predetermined angle in a direction away from the electric motor MOT in the front-rear direction as it goes away from the power conversion device PDU in the left-right direction (rotation axis direction). Thereby, when connecting the DC line 31 to the DC connector 51, a large space can be secured between the tip of the DC connector 51 and the electric motor case 40 in the front-back direction. As a result, it is easy to secure a work space, and thus maintainability is improved.

The DC connector 51 is arranged further on the rear side than the front surface 50F of the power conversion device PDU, that is, on the electric motor MOT side in the front-rear direction. The DC connector 51 can be prevented from being exposed further to the outside than the power conversion device PDU in the front-rear direction.

The DC connector 51 includes an internal connection portion 51a connected to a bus bar 53 arranged inside the power conversion device PDU and is connected via the bus bar 53 to a switching circuit arranged inside the power conversion device PDU. The internal connection portion 51a of the DC connector 51 is configured to be accessible from the upper surface side of the power conversion device. More specifically, the DC connector 51 is configured such that the internal connection portion 51a is accessible through an opening portion 55 provided in the upper surface 50U of the power conversion device PDU.

The internal connection portion 51a is provided with two terminal portions 51b and those two terminal portions 51b are arranged side by side inside the opening portion 55 when viewed from above. Therefore, the connection work between the internal connection portion 51a of the DC connector 51 and the bus bar 53 is performed by inserting a tool from above through the opening portion 55 and fastening the bus bar 53 to the two terminal parts 51b with bolts. As a result, the internal connection portion 51a and the bus bar 53 are electrically connected. When trying to insert the tool from the left-right direction or the front-rear direction, it is necessary to secure a tool insertion space inside the power conversion device PDU along the tool insertion direction. However, when inserting the tool from above into the internal connection portion 51a of the DC connector 51 provided in the upper side of the power conversion device case 50 to face the horizontal direction, there is no need for a tool insertion space along the tool insertion direction.

Therefore, it is possible to arrange other electric components and the like around the internal connection portion 51*a*, and thus it is possible to downsize the power conversion device PDU. In particular, it becomes possible to arrange other electric components and the like in a rear surface region Z of the internal connection portion 51*a*.

As described above, in the DC connector 51, since the internal connection portion 51*a* is configured to be accessible from above the power conversion device PDU, a tool space may be provided above the power conversion device PDU, in other words, outside the power conversion device PDU. Therefore, it is not necessary to secure a large tool space inside the power conversion device PDU, and thus the power conversion device PDU can be downsized.

The opening portion 55 is closed by welding or the like with a cover 57 after the connecting work between the internal connection portion 51*a* of the DC connector 51 and the bus bar 53. The opening portion 55 is not limited to welding, but may be detachably closed by bolting or the like. By connecting the internal connection portion 51*a* of the DC connector 51 and the bus bar 53 through the opening portion 55, and then closing the opening portion 55 with the cover 57, it is possible to prohibit access to the inside of the power conversion device PDU by mistake As illustrated in FIGS. 3 and 5, the drive unit 30 includes a sensor connection portion 60 which electrically connects a sensor provided in the electric motor MOT and the power conversion device PDU. Electrically connecting the sensor and the power conversion device PDU means that it is connected such that the signal from the sensor can be input to the power conversion device PDU. The sensor connecting portion 60 includes an electric-motor-side sensor connector 61 provided in the electric motor case 40, a device-side sensor connector 62 provided in the power conversion device case 50, and a signal line 63 for electrically connecting the electric-motor-side sensor connector 61 and the device-side sensor connector 62. The electric-motor-side sensor connector 61 is electrically connected to a sensor (not illustrated) provided in the electric motor MOT. The sensor is not particularly limited as long as it is a sensor that can detect the state of the electric motor MOT, and is, for example, a resolver which detects the rotational state of the electric motor MOT or a thermistor which detects the temperature of the electric motor MOT.

The device-side sensor connector 62 is arranged near the center of the power conversion device case 50. In other words, the device-side sensor connector 62 is arranged further on the left side than the DC connector 51. As described above, since the DC connector 51 provided on the right surface 50R of the power conversion device case 50 includes an internal connection portion 51*a* which is accessible from the upper surface 50U side of the power conversion device PDU, the space (rear surface region Z described above) further on the left side than the DC connector 51 can be effectively utilized. Therefore, it is possible to arrange components related to the device-side sensor connector 62 electrically connected to the sensor provided in the rotating electric machine by using that space.

Although the embodiment of the invention is described above, the invention is not limited to the embodiment described above and various modifications and improvements can be made as appropriate.

For example, in the embodiment described above, a hybrid vehicle having the engine ENG and the electric motor MOT as the driving sources is exemplified. However, an electric vehicle having only the electric motor MOT as the driving source may be used.

In the embodiment described above, the drive unit 30 accommodating the electric motor MOT is arranged on the rear side of the vehicle 1. However, the drive unit 30 may be arranged in the front room 6 and the electric motor MOT may be used as a drive source for driving the left and right front wheel FWs.

At least the following matters are described in the specification. Although components and the like corresponding to those of the embodiment described above are shown in parentheses, it is not limited thereto.

(1) A drive unit (drive unit 30) including:

a rotating electric machine (electric motor MOT) having a rotation axis (rotation axis CL) extending in a horizontal direction:

a rotating electric machine case (electric motor case 40) which accommodates the rotating electric machine; and a power conversion device (power conversion device PDU) electrically connected to the rotating electric machine and converting electric power supplied to the rotating electric machine and electric power supplied from the rotating electric machine, in which the power conversion device is arranged on one side (front side) of the rotating electric machine in an orthogonal direction (front-rear direction) orthogonal to both a rotation axis direction and an up-down direction, a first connector portion (DC connector 51) to which a power line (DC line 31) connected to a battery (battery BAT) is connected is provided on an upper portion of the power conversion device to face the horizontal direction, the first connector portion includes an internal connection portion (internal connection portion 51*a*) connected to a conductive member (bus bar 53) arranged inside the power conversion device, and the first connector portion is configured such that it is possible to access the internal connection portion from an upper side of the power conversion device.

According to (1), since the first connector portion is configured such that it is possible to access the internal connection portion from the upper side of the power conversion device, there should be a tool space in the upper side of the power conversion device. Therefore, it is not necessary to secure a large tool space inside the power conversion device, and thus the power conversion device can be reduced in size.

(2) The drive unit according to (1), in which the first connector portion is configured such that it is possible to access the internal connection portion from an opening portion (opening portion 55) provided on an upper surface (upper surface 50U) of the power conversion device, and the opening portion is closed by a cover (cover 57).

According to (2), the first connector portion is configured such that it is possible to access the internal connection portion from the opening portion provided on an upper surface of the power conversion device and the opening portion is closed by the cover after connecting the conductive member and the internal connection portion. Therefore, by connecting the internal connection portion of the first connector portion and the conductive member from the opening portion, and then closing the opening portion with the cover, it is possible to prevent access to the inside of the power conversion device by mistake.

(3) The drive unit according to (2), in which the internal connection portion is provided with a plurality of connection portions (terminal portions 51*b*), and the plurality of connection portions are arranged side by side inside the opening portion when viewed from above.

According to (3), since the plurality of connection portions are arranged side by side inside the opening portion as viewed from above, the work of connecting the conductive member and the internal connection portion becomes easy.

(4) The drive unit according to any one of (1) to (3), in which the power conversion device is provided with a first end (right surface 50R) and a second end (left surface 50L) in the rotation axis direction, the first connector portion is provided on the first end side of the power conversion device, and a second connector portion (device-side sensor connector 62), which is electrically connected to a sensor provided in the rotating electric machine, is provided further on the second end side than the first connector portion.

According to (4), since the first connector portion provided on the first end side of the power conversion device is configured so that it is possible to access the internal connection portion from the upper surface side of the power conversion device, it is possible to effectively utilize the space further on the second end side than the first connector portion. Therefore, it is possible to arrange components related to the second connector portion electrically connected to the sensor provided in the rotating electric machine by using that space.

(5) The drive unit according to any one of (1) to (4), in which the first connector portion is located below the upper surface (upper surface 50U) of the power conversion device.

According to (5), since the first connector portion is located below the upper surface of the power conversion device, the first connector portion is prevented from being exposed upward.

(6) The drive unit according to any one of (1) to (5), in which the first connector portion is located closer to the rotating electric machine case side (rear side) than a surface (front surface 50F) of the power conversion device, which is the surface on a side opposite to the rotating electric machine case in the orthogonal direction.

According to (6), the first connector portion is located closer to the rotating electric machine case side than the surface of the power conversion device, which is the surface on the side opposite to the rotating electric machine case in the orthogonal direction. Therefore, the first connector portion is prevented from being further exposed outside than the power conversion device in the orthogonal direction.

(7) The drive unit according to any one of (1) to (6), in which the power conversion device is provided with a first end (right surface 50R) and a second end (left surface 50L) in the rotation axis direction, when seen from the orthogonal direction, a lower side surface (right lower side surface 503), an upper side surface (right upper side surface 504) located closer to the second end than the lower side surface, and a step surface (step surface 505) connecting an upper end of the lower side surface and a lower end of the upper side surface in the rotation axis direction are provided on the first end side of the power conversion device, and the first connector portion is disposed on the upper side surface and is located closer to the second end side in the rotation axis direction than the lower side surface.

According to (7), the first connector portion is arranged on the upper side surface and is located further on an inner side than the lower side surface. Therefore, the first connector portion is prevented from being further exposed outside than the power conversion device in the rotation axis direction.

(8) The drive unit according to any one of (1) to (7), in which the power conversion device is provided with a first end (right surface 50R) and a second end (left surface 50L) in the rotation axis direction, and the first connector portion is provided on the first end side, and when seen from above, the first connector portion is arranged to protrude from the power conversion device at a predetermined angle in a direction (front side) away from the rotating electric machine in the orthogonal direction as it goes away (rightward) from the power conversion device in the rotation axis direction.

According to (8), when seen from above, the first connector portion is arranged to protrude from the power conversion device at the predetermined angle in the direction away from the rotating electric machine in the orthogonal direction as it goes away from the power conversion device in the rotation axis direction. Therefore, it is easy to secure a work space, and thus maintainability is improved.

The invention claimed is:

1. A drive unit comprising:
   a rotating electric machine having a rotation axis extending in a horizontal direction;
   a rotating electric machine case which accommodates the rotating electric machine; and
   a power conversion device electrically connected to the rotating electric machine and configured to convert electric power supplied to the rotating electric machine and electric power supplied from the rotating electric machine, wherein:
   the power conversion device is arranged on one side of the rotating electric machine in an orthogonal direction orthogonal to both a rotation axis direction and an up-down direction;
   a first connector portion, to which a power line connected to a battery is connected, is provided on an upper portion of the power conversion device to face the horizontal direction;
   the first connector portion includes an internal connection portion connected to a conductive member arranged inside the power conversion device; and
   the first connector portion has a configuration in which the internal connection portion permits access from an upper side of the power conversion device.

2. The drive unit according to claim 1, wherein:
   the first connector portion has a configuration in which the internal connection portion permits access from an opening portion provided on an upper surface of the power conversion device; and
   the opening portion is closed by a cover.

3. The drive unit according to claim 2, wherein:
   the internal connection portion is provided with a plurality of connection portions; and
   the plurality of connection portions are arranged side by side inside the opening portion when viewed from above.

4. The drive unit according to claim 1, wherein:
   the power conversion device is provided with a first end and a second end in the rotation axis direction;
   the first connector portion is provided on the first end side of the power conversion device; and
   a second connector portion, which is electrically connected to a sensor provided in the rotating electric machine, is provided further on the second end side than the first connector portion.

5. The drive unit according to claim 1, wherein the first connector portion is located below the upper surface of the power conversion device.

6. The drive unit according to claim 1, wherein
the first connector portion is located closer to the rotating electric machine case side than a surface of the power conversion device, which is the surface on a side opposite to the rotating electric machine case in the orthogonal direction.

7. The drive unit according to claim 1, wherein:
the power conversion device is provided with a first end and a second end in the rotation axis direction;
when seen from the orthogonal direction, a lower side surface, an upper side surface located closer to the second end than the lower side surface, and a step surface connecting an upper end of the lower side surface and a lower end of the upper side surface in the rotation axis direction are provided on the first end side of the power conversion device; and
when seen from the orthogonal direction, the first connector portion is disposed on the upper side surface and is located closer to the second end side in the rotation axis direction than the lower side surface.

8. The drive unit according to claim 1, wherein:
the power conversion device is provided with a first end and a second end in the rotation axis direction; and
the first connector portion is provided on the first end side, and when seen from above, the first connector portion is arranged to protrude from the power conversion device at a predetermined angle in a direction away from the rotating electric machine in the orthogonal direction as it goes away from the power conversion device in the rotation axis direction.

* * * * *